United States Patent [19]
Goddard

[11] Patent Number: 5,765,880
[45] Date of Patent: Jun. 16, 1998

[54] PIPE COUPLER

[75] Inventor: James B. Goddard, Powell, Ohio

[73] Assignee: Advanced Drainage Systems, Inc., Columbus, Ohio

[21] Appl. No.: 726,964

[22] Filed: Oct. 7, 1996

[51] Int. Cl.⁶ .................................................. F16L 21/035
[52] U.S. Cl. ......................... 285/231; 285/345; 285/423; 285/903
[58] Field of Search ............................. 285/231, 345, 285/423, 903

[56] References Cited

U.S. PATENT DOCUMENTS

| | | |
|---|---|---|
| 3,239,254 | 3/1966 | Campbell . |
| 3,753,237 | 8/1973 | Ziemek et al. . |
| 3,938,834 | 2/1976 | OOtenbrink . |
| 4,141,576 | 2/1979 | Lupke et al. . |
| 4,149,740 | 4/1979 | Hall . |
| 4,229,028 | 10/1980 | Gray . |
| 4,362,187 | 12/1982 | Harris ..................... 285/345 X |
| 4,443,031 | 4/1984 | Borsh et al. . |
| 4,647,074 | 3/1987 | Pate et al. . |
| 4,795,197 | 1/1989 | Kaminski et al. . |
| 4,871,198 | 10/1989 | Hattori et al. . |
| 4,913,473 | 4/1990 | Bonnema et al. . |
| 5,006,376 | 4/1991 | Arima et al. . |
| 5,163,717 | 11/1992 | Wise . |
| 5,326,138 | 7/1994 | Claes et al. ............... 285/423 X |
| 5,415,436 | 5/1995 | Claes et al. ............... 285/903 X |
| 5,478,123 | 12/1995 | Kanao ...................... 285/903 X |

FOREIGN PATENT DOCUMENTS 1080305  8/1967  United Kingdom .

Primary Examiner—Dave W. Arola
Attorney, Agent, or Firm—Kremblas, Foster, Millard & Pollick

[57] ABSTRACT

A coupler for use with helical double-wall corrugated pipe is disclosed having a spigot portion and a bell portion. The spigot portion has at least one corrugation formed therein, a spigot portion first edge and a spigot portion second edge, and is adapted to screw onto the end of a first pipe having a first pipe corrugated outer wall and a first pipe inner wall. The spigot portion second edge is adapted to be secured to the first pipe outer wall, and the spigot portion first edge is adapted to be secured to the first pipe inner wall. The bell portion has at least one corrugation formed therein, a bell portion first edge, and a bell portion second edge, and is adapted to screw onto the end of a second pipe having a second pipe corrugated outer wall and a second pipe inner wall. The bell portion second edge is adapted to be secured to the second pipe outer wall, and the bell portion first edge is adapted to be secured to the second pipe inner wall.

17 Claims, 4 Drawing Sheets

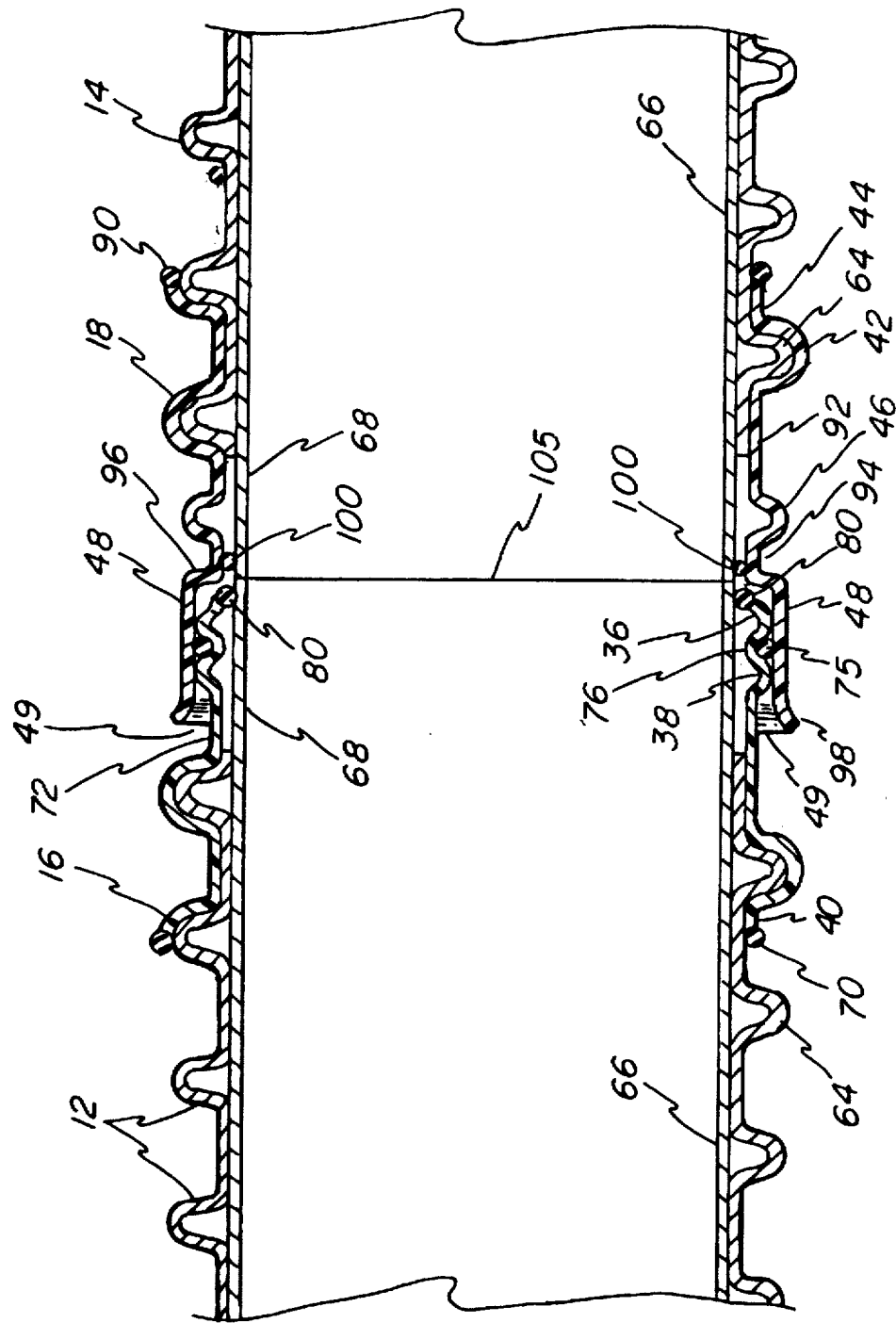

PIPE COUPLER

FIELD OF THE INVENTION

This invention relates to a coupler for use with pipe, and more particularly to a coupler for use in the installation of helical, double-wall corrugated plastic pipe in applications where no leakage is desired.

BACKGROUND OF THE INVENTION

This invention is directed to the providing of a coupler for use with pipe designed to be utilized in connection with the providing of adequate drainage or passage of a liquid through such pipe. The use of coupling units or couplers per se is not new. With respect to most prior art plastic pipe, including pipe known as double-wall pipe, the providing of a liquid impervious seal relative to the adjacent pipe sections is not of extreme importance even in many types of drainage applications, since there will be no substantial pressure in the line during use. However, where the nature of use for the pipe requires that sanitary sewage pass therethrough, or where pressure on the liquid carried through the pipe is present due to the pumping of the liquid or to a condition known as positive head, a condition which exists when the quantity of liquid within the pipe renders it almost full, it is desirable, if not necessary, that no leakage occur.

As mentioned briefly above, couplers are known in the prior art associated with pipe used in such applications. A typical type of coupler involves a polyethylene wrap secured about the adjacent ends of pipe by a fastener. These split-couplers normally require an overlap, such that a gap between the interior surface of the coupler and the exterior surface of the pipe is invariably present. Even if a gasket is placed between the adjacent pieces of pipe, installation in conjunction with the wrapped coupler may still result in a leak. This is especially the case when the pressure increases inside the pipe, as well as when the earth experiences shifts, since the force of the earth tends to break the wrapped coupler's seal as inwardly directed pressure on the pipe is changed. A coupler similar to this is disclosed in U.S. Pat. No. 3,239,254 to Campbell.

Another type of coupler utilizes a heat shrink wrap as is disclosed in Lupke et al., U.S. Pat. No. 4,141,576. Obviously, this type of coupler has disadvantages in applications with large diameter corrugated pipe where there is a need for the pipe to remain water-tight over an extended period of time.

A number of couplers are known which comprise two a arcuate sections, hinged or independent, of one another, with these two sections being secured together. Examples of such couplers include Borsh et al., U.S. Pat. No. 4,443,031, and Pate, U.S. Pat,. No. 4,647,074. However, it should be noted that both of those couplers are specifically designed to work with annular conduit systems, as opposed to helical. This distinction is important, because it is far easier to effect a water-tight seal on an annular system than it is with helical. This is due to the configurations of the respective conduit structures.

Additionally, Pate and Borsh et al are clearly not watertight. Pate discloses a coupler designed to work with a flexible conduit system, which system in turn is designed for use with electrical wiring installation. Borsh et al. also discloses a coupler designed to work with flexible conduit systems used in electrical wiring installations. Neither patent even addresses a water-tight seal, nor the use of their respective inventions with pipe.

Bonnena et al., U.S. Pat. No. 4,913,473 and Wise. U.S. Pat. No. 5,163,717 disclose couplers or coupling systems for use with corrugated pipe, albeit annular not helical Bonnema et al. discloses a coupling system in the way (of an invention in a continuously formed large diameter, double-walled plastic pipe. The pipe is designed to be cut into segments for installation. Each pipe segment features an integral sleeve component and a disposable collar portion, which collar portion after removal from the end of a pipe segment permits one pipe segment's integral sleeve component to be attached to another pipe segment. Use of the Bonnema et al. invention necessitates the cutting and removal of the inner wall of the double-walled pipe. With precise cutting the inner wall of the joined pipes remains continuous.

The Wise patent also discloses a pipe coupler for use with annular pipe. It features a flexible coupler in the form of a circumferenltially continuous tubular structure. However, neither patent addresses the problems associated with helical pipe.

Several patents do disclose couplers for use with helical pipe. Examples of such patents include Hall, U.S. Pat. No. 4,149,740, and Kaminski, U.S. Pat. No. 4,795,197. Hall discloses a pipe coupler for use with pipe which appears substantially helical. However, interestingly enough the ends of each pipe section with which the coupler of Hall can be used either must be flat and level as shown in FIG. 3 of Hall, or be fabricated with the outwardly extending flange as shown in FIG. 2 of Hall. Consequently, Hall recognized the problem associated with trying to obtain a water-tight seal in true helical pipe.

The Kaminski patent, discloses a coupling for seed and fertilizer hoses, and as such is not concerned with whether the coupling is effectively water-tight. Its concern is with providing a relatively air-tight seal. Although the coupling of Kaminski could be used with true helical pipe, it would not be expected to perform in drainage applications so as to guarantee the integrity of the drainage system.

A unique method for interconnecting two coaxial tube systems is disclosed in Ziemek et al. That patent discloses a method for interconnecting two coaxial tube systems, each having at least two corrugated tubes. Welding is mentioned in the patent, but from the context of the patent it is clear that the pipe shown in Ziemek et al. is metal, not plastic. Furthermore, there is no requirement that the tube system of Ziemek et al. be water-tight.

The problem addressed by this invention has been exacerbated in recent years by the introduction of corrugated pipe in increasingly larger sizes, such as those having a diameter of 30" or more. Attendant with larger diameter pipe are problems with coupling characteristics due to correspondingly greater corrugation pitches, deeper valleys, thicker walls, and the rigidity and inflexibility required to meet industry and performance specifications.

It, is thus apparent that the need exists for an improved coupler for pipe which provides for an effective water-tight seal, and specifically such a coupler as can be used with helical corrugated pipe.

SUMMARY OF THE INVENTION

In accordance with this invention a coupling device is formed for use with helical, double-wall corrugated drainage pipe, and more preferably for use with such pipe in applications where there are concerns concerning leakage either into or out of the pipe. The coupler is for use in connecting a first and a second helical, double-wall corrugated plastic pipe, with the coupler comprising a spigot portion and a bell portion.

The spigot portion has at least one corrugation formed therein, a spigot portion first edge and a spigot portion second edge. The spigot portion is adapted to screw onto the end of a first helical, double-wall corrugated pipe having a first pipe outer wall and a first pipe inner wall. The spigot portion second edge is adapted to be secured to the first pipe outer wall. The spigot portion first edge is adapted to be secured to the first pipe inner wall.

The bell portion has at least, one corrugation formed therein, a bell portion first edge, and a bell portion second edge. The bell portion is adapted to screw onto the end of a second helical, double-wall corrugated pipe having a second pipe outer wall and a second pipe inner wall. The bell portion second edge is adapted to be secured to the second pipe outer wall. The bell portion first edge is adapted to be secured to the second pipe inner wall.

The spigot portion of the coupler has a relatively planar portion intermediate the spigot first edge and the corrugation formed in the spigot portion. This relatively planar portion has at least two rib elements, with an intermediate valley being between the two rib elements.

The bell portion of the coupler has a collar intermediate the bell first edge and the corrugation formed in the bell portion. Additionally, the bell portion has a rib element intermediate the collar and the corrugation formed in the bell portion. The collar is adapted to overlay the relatively planar portion. Preferably an O-ring is retained between the two rib elements of the relatively planar portion, such that when the coupler is in use the O-ring is also wedged between the collar and the relatively planar portion.

There is also disclosed in combination, a first and a second helical, double-wall corrugated pipe, each of the first and second pipe having an outer wall and an inner wall, and a coupler for use in connecting the first and the second helical, double-wall corrugated plastic pipe. The coupler comprises a spigot portion and a bell portion. The spigot portion has at least one corrugation formed therein, a spigot portion first edge, a spigot portion second edge, and a relatively planar portion intermediate the spigot first edge and the corrugation formed in the spigot portion, with the relatively planar portion having at least two rib elements, with an intermediate valley being between the two rib elements, and with the intermediate valley adapted to have an O-ring retained between the two rib elements.

The spigot portion is adapted to screw onto the end of a first helical, double-wall corrugated pipe having a first pipe outer wall and a first pipe inner wall. The spigot portion second edge is secured to the first pipe outer wall. The spigot portion first edge is secured to the first pipe inner wall.

The bell portion has at least one corrugation formed therein, a bell portion first edge, a bell portion second edge, and a collar intermediate the bell first edge and the corrugation formed in the bell portion. A rib element is intermediate the collar and the corrugation formed in the bell portion. The collar is adapted to overlay the relatively planar portion.

The bell portion is adapted to screw onto the end of a second helical, double-wall corrugated pipe having a second pipe outer wall and a second pipe inner wall. The bell portion second edge is secured to the second pipe outer wall, while the bell portion first edge is secured to the second pipe inner wall.

There is also disclosed a coupler for use in connecting a first and a second helical, double-wall corrugated plastic pipe, the first pipe having a first pipe outer wall and a first pipe inner wall, the second pipe having a second pipe outer wall and a second pipe inner wall. The improvement comprises a coupler having a spigot portion and a bell portion, with the spigot portion having at least one corrugation formed therein, a spigot portion first edge and a spigot portion second edge, and with the bell portion having at least, one corrugation formed therein, a bell portion first edge, and a bell portion second edge. The spigot portion has a relatively planar portion intermediate the spigot first edge and the corrugation formed in the spigot portion. The relatively planar portion has at least two rib elements, with an intermediate valley being between the two rib elements, and with the intermediate valley adapted to have an O-ring retained between the two rib elements. The bell portion has a collar intermediate the bell first edge and the corrugation formed in the bell portion. The collar is adapted to overlay the relatively planar portion. The bell portion also has a rib element intermediate the collar and the corrugation formed in the bell portion.

The spigot portion is adapted to screw onto the end of a first pipe. The spigot portion second edge is adapted to be secured to the first pipe outer wall. The spigot portion first edge is adapted to be secured to the first pipe inner wall. The bell portion is adapted to screw onto the end of a second pipe. The bell portion second edge is adapted to be secured to the second pipe outer wall. The bell portion first edge is adapted to be secured to the second pipe inner wall. In addition to preferably having an O-ring retained between the two rib elements of the relatively planar portion, when the coupler is in use the O-ring is also wedged between the collar and the relatively planar portion.

The primary objective of this invention is to provide a coupler for use with helical, double-wall corrugated plastic pipe, which coupler is of extremely economical construction and is particularly easy, to utilize in the laying of pipe. Important aspects of this objective are the fabricating of a coupler which produces an acceptable seal against leakage, which seal remains intact despite shifting of the pipe and variations of pressure on the outer surface of such pipe.

Other objects and advantages of the invention will be apparent from the following description, the accompanying drawings, and the appended claims.

BRIEF DESCRIPTION OF THE DRAWINGS

FIG. 5 is a vertical sectional view on a greatly enlarged scale taken along the elongated central axis of FIG. 1.

DETAILED DESCRIPTION OF THE DRAWINGS

Figure 1:
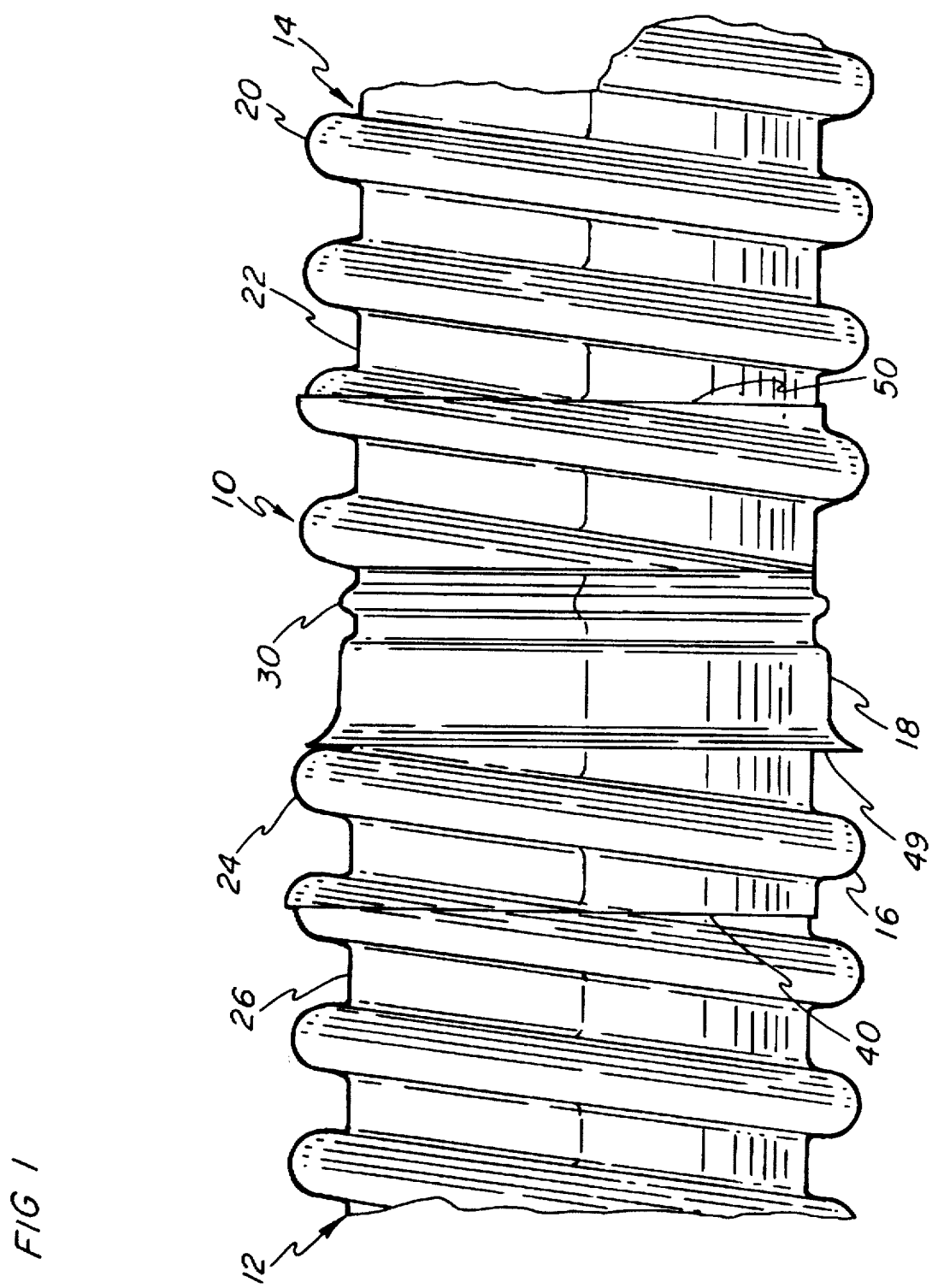
FIG. 1 is a side elevational view of a coupler in accordance with the present invention installed in operative relationship onto the ends of two helical, double-wall corrugated pipes.

Having reference to the drawings, attention is directed first to FIG. 1 which discloses a side elevational view made in accordance with the present, invention, showing the coupler installed in operative relationship onto the ends of two helical, double-wall corrugated pipes. The coupler as shown is designated generally by the numeral 10 with the two pipes to which the coupler is connected being first pipe 12 and second pipe 14. It will be appreciated that the coupler of this intention is formed having a spigot, portion 16 and a bell portion 18.

Figure 2:
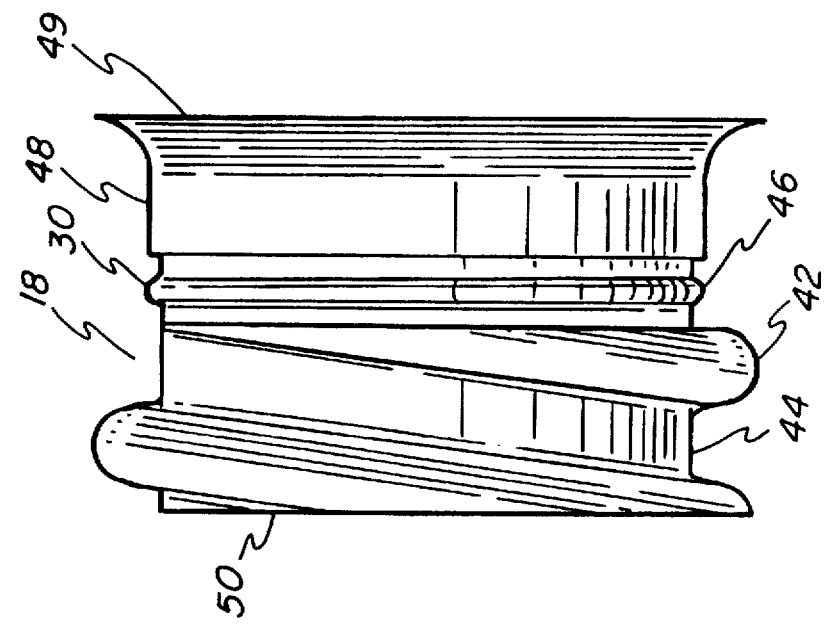
FIG. 2 is an side elevational view of the spigot component of the coupler of the present invention.

It will be observed that both the first pipe 12 and second pipe 14 are formed having a plurality of pipe corrugations 20 and a plurality of pipe valleys 22. Similarly it will be appreciated that coupler 10 is formed having coupler corrugations 24 and coupler valleys 26 preferably having an inner diameter slightly greater than the inner diameters associated with the corrugations and valleys of the pipes to which the connector is secured. Additionally, it will be seen that the coupler as shown in FIG. 1 includes a rib element 30. Comparing now FIG. 1, 2, 3 and 4, and paying particular attention to FIG. 2, it, will be noted that that particular figure discloses a single spigot portion, with that spigot portion having its own spigot corrugation 32 and spigot valley 34. Additionally, a first spigot rib element 36 and a second spigot rib element 38 are shown. As is the case with all the coupler corrugations and rib elements, 24 and 30 respectively, the height and width of the corrugations are approximately 3–4 times as great as the height and width of the rib elements.

In addition, it will be appreciated that each spigot portion 16 has a spigot first edge 39 and a spigot second edge 40. It will be appreciated that the spigot corrugation and the spigot valley 32 and 34 respectively are adjacent the spigot second edge 40 while the two rib elements 36, 38 are adjacent the spigot first, edge 39. Further, it will be noted that the first spigot rib element 36 is disposed between the spigot rib element 38 and spigot first edge 39.

Figure 3:
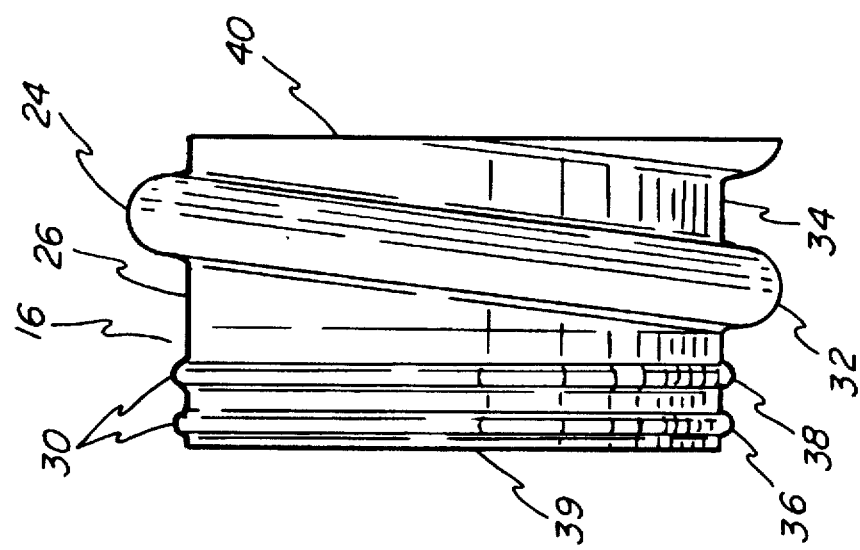
FIG. 3 is an side elevational view of the bell component of the coupler of the present invention.

Turning now to FIG. 3 in particular, it will be noted that FIG. 3 discloses a bell portion 18 having bell corrugation 42, bell valley 44, and bell rib element 46. A collar 48 is positioned between the bell rib element 46 and bell first edge 49. In addition, on the opposite side of the bell is a second edge bell 50. Once again, the rib element is closer to the first edge while the corrugation and valley are closer to the bell second edge.

In the preferred embodiment of the invention the height associated with the collar 48 lies between the height associated with the bell rib element and the bell corrugation. Additionally, the width associated with the collar is preferably slightly greater than that associated with the width of a single bell corrugation.

Figure 4:
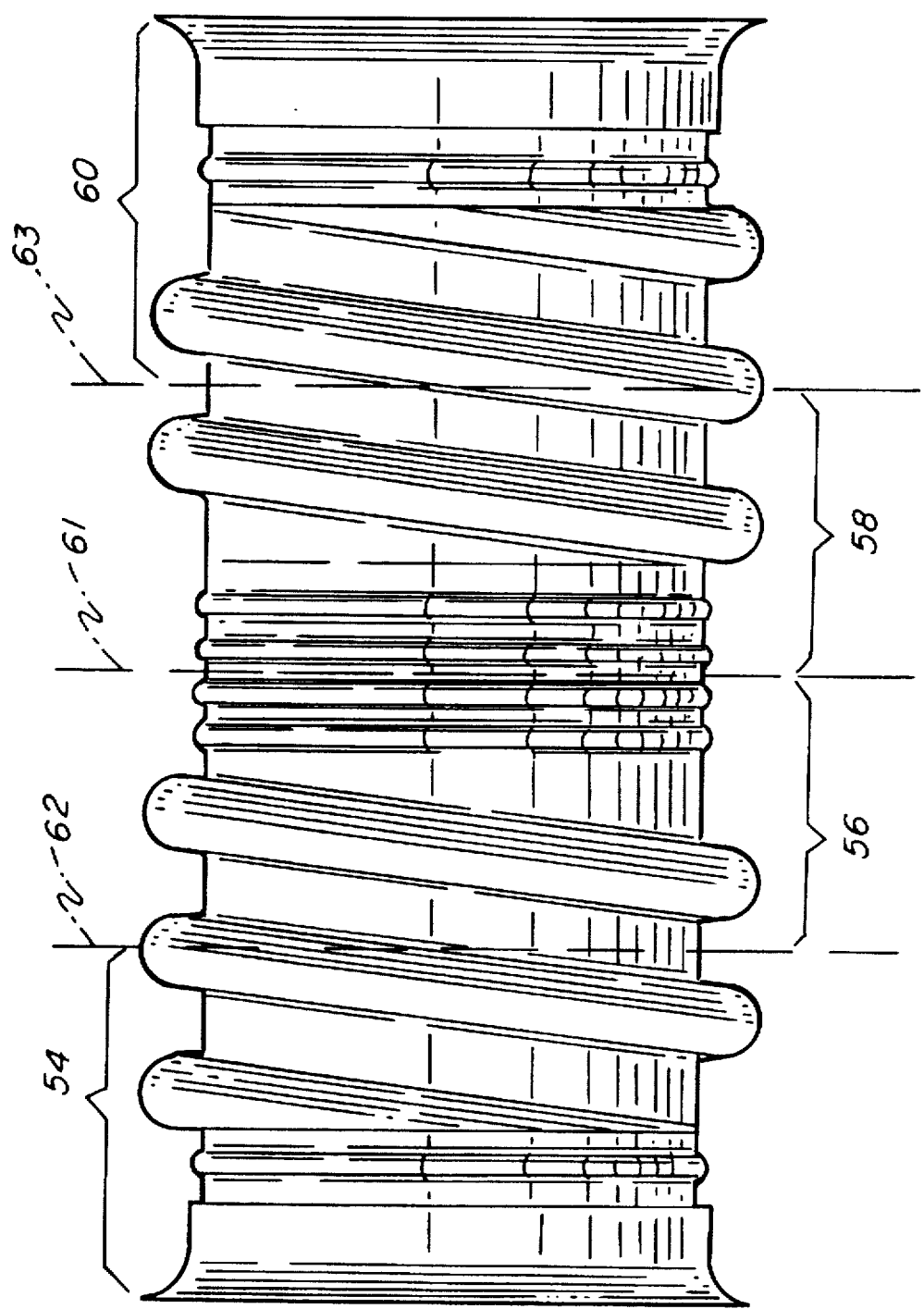
FIG. 4 is a side elevational view of the coupler when fabricated.

The coupler 10 of this invention is preferably fabricated using a roto molding process. As fabricated, the initial molded product appears in FIG. 4. This product comprises a first section 54, second section 56, third section 58, and a fourth section 60. The first second 54 and fourth section 60 resemble, and ultimately become bell portions 18. Meanwhile, the second section 56 and third section 58 resemble, and ultimately become, spigot portions 16. Manufacture of the specific bell and spigot portions of this invention may be accomplished from the roto molded product by cutting along first cut line 61, second cut line 62, and third cut line 63 as shown in FIG. 4. Thus it may be appreciated that each roto molded product results in two pairs of bell and spigot portions.

The material from which the coupler 10 of this invention is fabricated is preferably the same as is used to fabricate the helical, double-wall corrugated pipe with which the coupler is to be used. This particular coupler may be used with pipe of any diameter, but it is believed to be particularly useful for use with large diameter pipe such as 30", 36", 42" and 48" diameter pipe. Relative dimensions of the coupler of the type which would be used in conjunction with 42" diameter pipe are as follows: the height of the corrugations is approximately 3", the width of the corrugations is approximately 4" as is the corresponding widths of the valleys, and the initial product of the roto molding process shown in FIG. 4 is 66" in length.

FIG. 5 discloses a vertical sectional view on a greatly enlarged scale taken along the elongate central axis of FIG. 1. From this drawing it may be appreciated that the first and second pipes 12 and 14, as are any helical, double-wall corrugated pipe are formed having an outer wall 64 and an inner wall 66. However, it will be noted that in conjunction with the installation of the coupler of this invention onto the respective ends of the two pipes, that a section of the outer wall 64 is removed. For example, in 42" diameter pipe, it is expected that approximately 6" of the outer wall will be removed from each pipe end. This results in an exposed inner wall section 68.

The coupler is installed on the pipe by screwing spigot portion 16 onto the end of first pipe 12 and bell portion 18 onto the end of the second pipe 14. When screwed to approximately the position as shown FIG. 5, a first spigot weld 70 is performed so as to mechanically secure spigot second edge 40 to the outer wall 64 of the first pipe 12.

It will also be noted that associated with the spigot, portion 16 is a relatively planar portion 72. With this relatively planar portion being between the corrugations 37 and the first spigot edge 39. Both first spigot rib element 36 and second spigot rib element 38 are on this relatively planar portion 72. An O-ring 75 is placed in the intermediate valley 76 between first spigot rib element 36 and second spigot rib element 38. The relatively planar portion 72 of the spigot portion 16 is also preferably welded at a second spigot weld 80 directly onto the exposed inner wall section 68 of inner wall 66.

Similarly, the bell portion 18 is screwed onto the second pipe 14 until approximately in the position shown in FIG. 5. A first bell weld 90 is then positioned adjacent the bell second edge 50 and connects the bell portion 18 to the outer wall 64 of second pipe 14. On each side of the bell rib element 46 are two substantially planar portions of the bell 18. A bell first planar portion 92 is located between the bell rib element 46 and the bell corrugations and valleys 42, 44. A bell second planar portion is on the opposite side of the bell rib element 46 from the bell first planar portion 92. A collar connector 96 extends generally perpendicular to the bell second planar portion 94 and serves to connect the bell second planar portion to collar 48. It will be noted that collar 48 terminates along the bell first edge 49 in a generally out turned lip 98. It will also be noted that a second bell weld 100 is placed between the exposed inner wall section 68 of inner wall 66 and preferably the bell second portion 94. More preferably this placement of the second bell weld 100 is near the juncture of the bell second planar portion 94 with the collar connector 96. The presence of welds 70, 80, 90, and 100 serve to fixedly secure the spigot and bell respectively to the first and second pipe respectively.

Once the coupler components are secured to their respective pipes, the two pipes may be connected by sliding the collar 48 over the relatively planar portion 72. In so doing, the O-ring is wedged between the collar 46 and intermediate valley 76. In the embodiment of the invention having the dimensions discussed above, the O-ring is preferably a 1" O-ring. Due to the presence of the various welds and the compression on the O-ring as the two pipe sections are brought together along seam 105, a water-tight seal is formed at the site of the coupling.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A coupler for use in connecting a first and a second helical, double-wall corrugated plastic pipe, said coupler comprising,
   - a spigot portion, said spigot portion having at least one corrugation formed therein, a spigot portion first edge and a spigot portion second edge, said spigot portion being adapted to screw onto the end of a first pipe, said first pipe being helical, double-wall corrugated pipe, said first pipe having a first pipe outer wall and a first pipe inner wall, said spigot portion second edge secured to said first pipe outer wall, said spigot portion first edge secured to said first pipe inner wall, and
   - a bell portion, said bell portion having at least one corrugation formed therein, a bell portion first edge, and a bell portion second edge, said bell portion being adapted to screw onto the end of a second pipe, said second pipe being helical, double-wall corrugated pipe, said second pipe having a second pipe outer wall and a second pipe inner wall, said bell portion second edge secured to said second pipe outer wall, said bell portion first edge secured to said second pipe inner wall.

2. The coupler according to claim 1 wherein said spigot portion has a relatively planar portion intermediate said spigot first edge and said corrugation formed in said spigot portion.

3. The coupler according to claim 2 wherein said relatively planar portion has at least two rib elements, with an intermediate valley being between said two rib elements.

4. The coupler according to claim 3 wherein said bell portion has a collar intermediate said bell first edge and said corrugation formed in said ball portion, and which includes an O-ring, said O-ring being retained between said two rib elements.

5. The coupler according to claim 4 wherein said collar is adapted to overlay said relatively, planar portion such that said O-ring is wedged between said collar and said relatively planar portion.

6. The coupler according to claim 2 wherein said bell portion has a collar intermediate said bell first, edge and said corrugation formed in said bell portion.

7. The coupler according to claim 6 wherein said bell portion has a rib element intermediate said collar and said corrugation formed in said bell portion.

8. The coupler according to claim 6 wherein said collar is adapted to overlay said relatively planar portion.

9. In combination, a first and a second helical, double-wall corrugated pipe, each of said first and second pipe having an outer wall and an inner wall, and
   a coupler for use in connecting said first and said second helical, double-wall corrugated plastic pipe, said coupler comprising a spigot portion, said spigot portion having at least one corrugation formed therein, a spigot portion first edge, a spigot portion second edge, and a relatively planar portion intermediate said spigot first edge and said corrugation formed in said spigot portion, said relatively planar portion having at least two rib elements, with an intermediate valley being between said two rib elements, said intermediate valley adapted to have an O-ring retained between said two rib elements, said spigot portion being adapted to screw onto the end of a first pipe, said first pipe being helical, double-wall corrugated pipe, said first pipe having a first pipe outer wall and a first pipe inner wall, said spigot portion second edge secured to said first pipe outer wall, said spigot portion first edge secured to said first pipe inner wall, and a bell portion, said bell portion having at least one corrugation formed therein, a bell portion first edge, a bell portion second edge, and a collar intermediate said bell first edge and said corrugation formed in said bell portion, said bell portion having a rib element intermediate said collar and said corrugation formed in said bell portion, said collar adapted to overlay said relatively planar portion, said bell portion being adapted to screw onto the end of a second pipe, said second pipe being helical, double-wall corrugated pipe, said second pipe having a second pipe outer wall and a second pipe inner wall, said bell portion second edge secured to said second pipe outer wall, said bell portion first edge secured to said second pipe inner wall.

10. A coupler for use in connecting a first and a second helical, double-wall corrugated plastic pipe, the first pipe having a first pipe outer wall and a first pipe inner wall, the second pipe having a second pipe outer wall and a second pipe inner wall, where the improvement comprises said coupler having
    a spigot portion, said spigot portion having at least one corrugation formed therein, a spigot portion first edge and a spigot portion second edge, said spigot portion being adapted to screw onto the end of a first pipe, said spigot portion second edge secured to the first pipe outer wall, said spigot portion first edge secured to the first pipe inner wall, and
    a bell portion, said bell portion having at least one corrugation formed therein, a bell portion first edge, and a bell portion second edge, said bell portion being adapted to screw onto the end of a second pipe, said bell portion second edge secured to the second pipe outer wall, said bell portion first edge secured to the second pipe inner wall.

11. The coupler according to claim 10 wherein said spigot portion has a relatively planar portion intermediate said spigot first edge and said corrugation formed in said spigot portion.

12. The coupler according to claim 11 wherein said relatively planar portion has at least two rib elements, with an intermediate valley being between said two rib elements.

13. The coupler according to claim 12 wherein said bell portion has a collar intermediate said bell first edge and said corrugation formed in said bell portion, and which includes an O-ring, said O-ring being retained between said two rib elements.

14. The coupler according to claim 13 wherein said collar is adapted to overlay said relatively planar portion such that said O-ring is wedged between said collar and said relatively planar portion.

15. The coupler according to claim 11 wherein said bell portion has a collar intermediate said bell first edge and said corrugation formed in said bell portion.

16. The coupler according to claim 15 wherein said bell portion has a rib element intermediate said collar and said corrugation formed in said bell portion.

17. The coupler according to claim 15 wherein said collar is adapted to overlay said relatively planar portion.

* * * * *